July 23, 1968  A. B. BUTTERWORTH  3,393,520
CONTAINER AND METHOD OF BUILDING A BREAKWATER
Filed Sept. 7, 1965  4 Sheets-Sheet 1
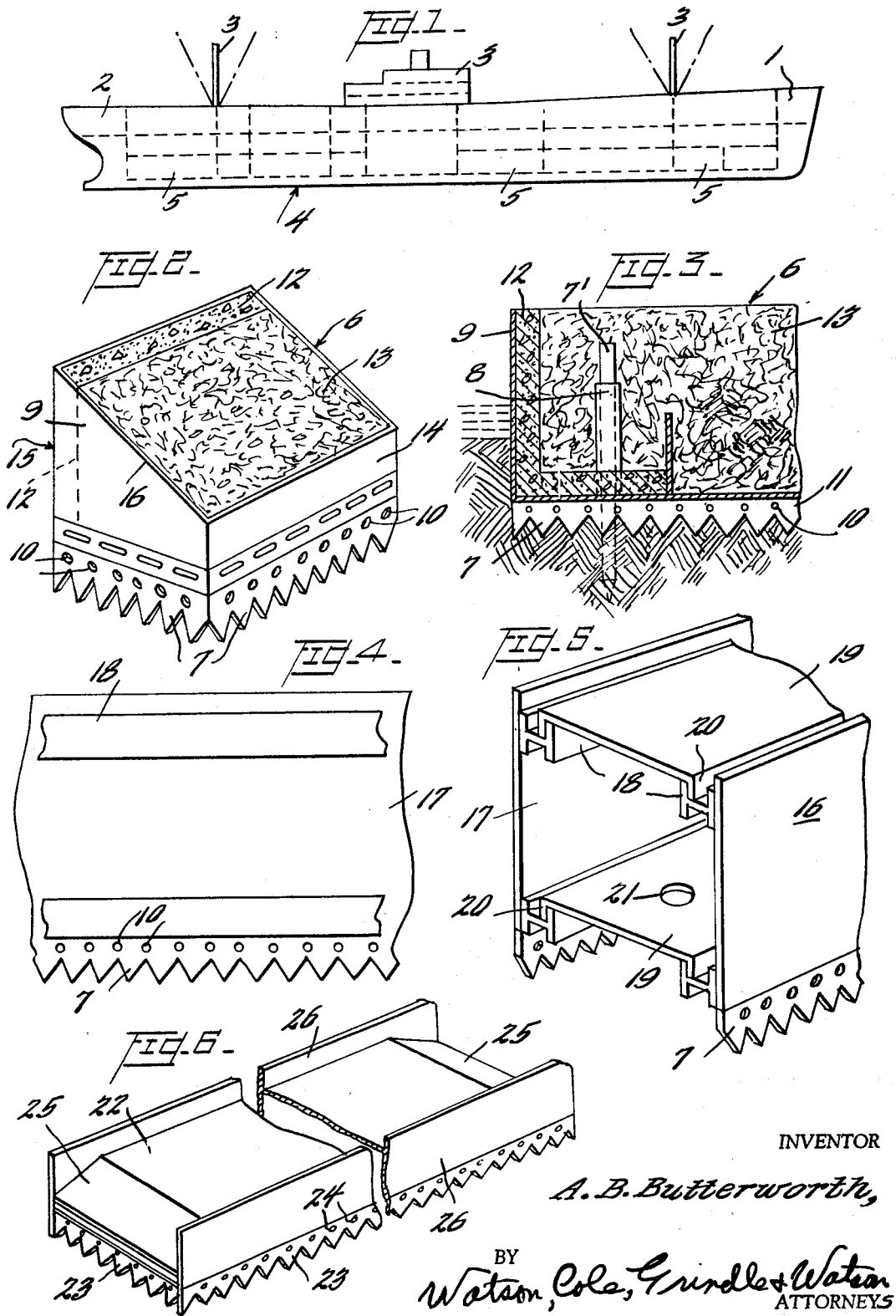
INVENTOR
A. B. Butterworth,
BY Watson, Cole, Grindle & Watson
ATTORNEYS

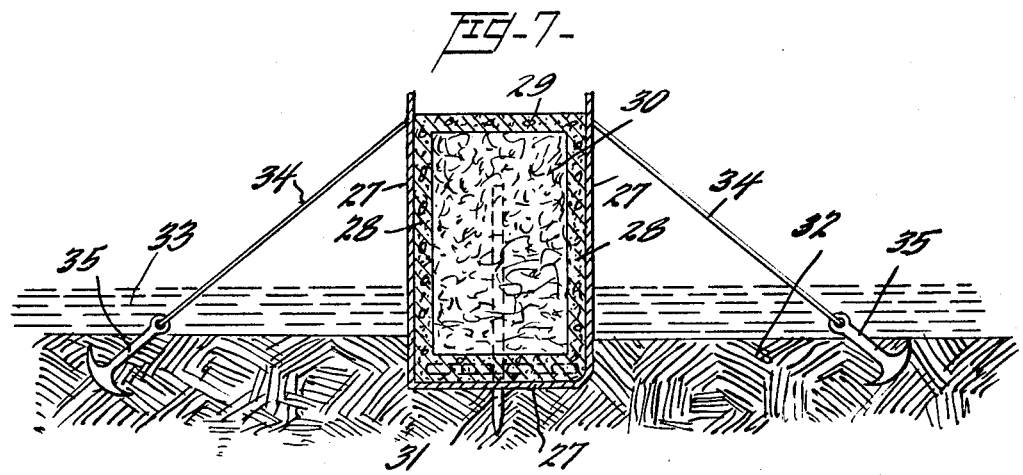
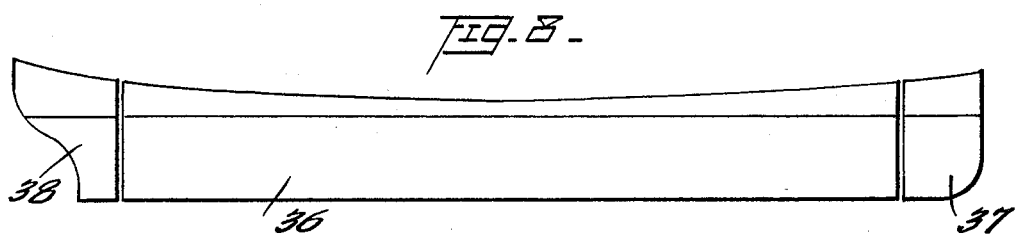
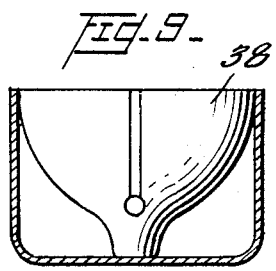
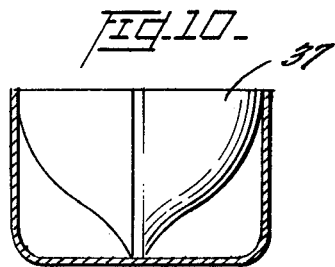
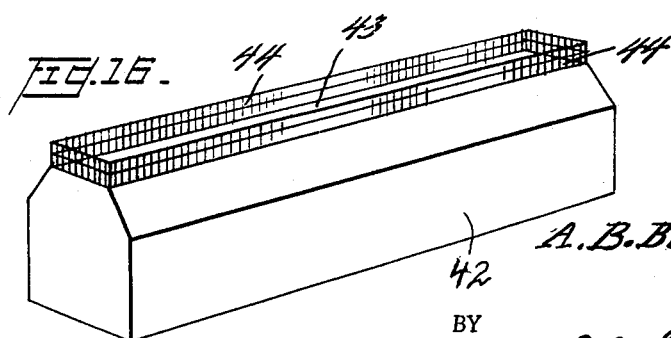

July 23, 1968  A. B. BUTTERWORTH  3,393,520
CONTAINER AND METHOD OF BUILDING A BREAKWATER
Filed Sept. 7, 1965  4 Sheets-Sheet 3
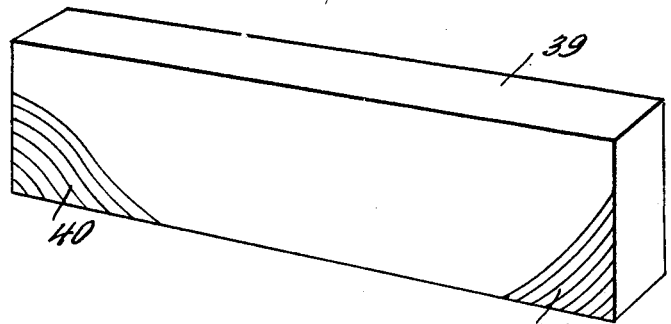
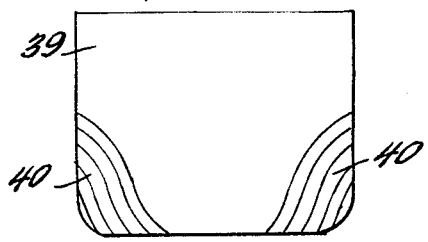
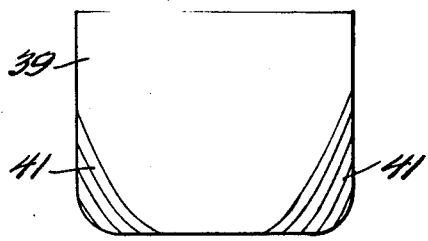
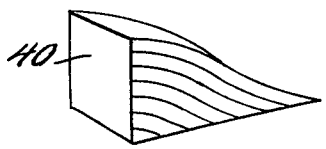
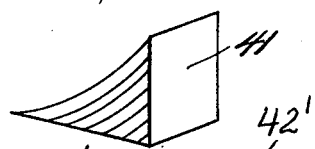
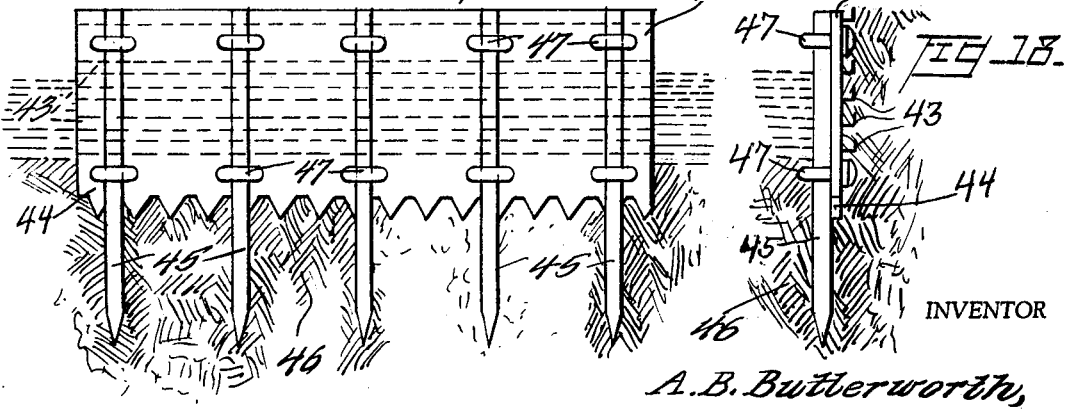
INVENTOR
A.B. Butterworth,
BY
Watson, Cole, Grindle & Watson
ATTORNEYS

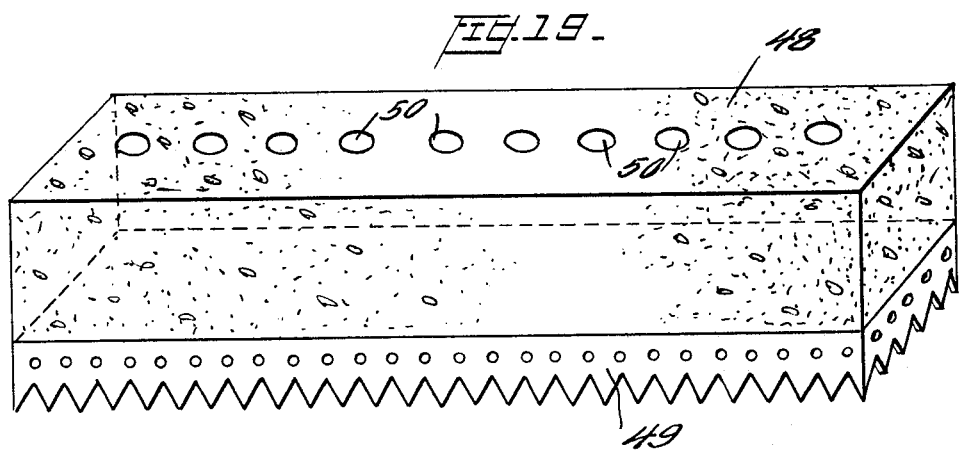
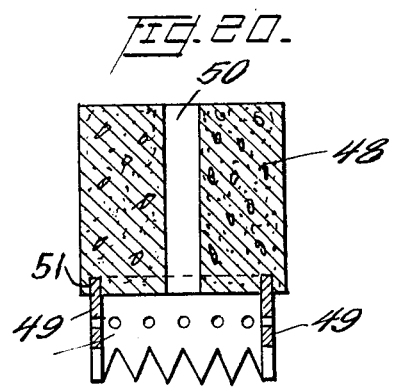

United States Patent Office 3,393,520
Patented July 23, 1968

3,393,520
CONTAINER AND METHOD OF BUILDING
A BREAKWATER
Arthur B. Butterworth, Rushmere, Va.
(R.F.D. 2, Box 277, Smithfield, Va. 23430)
Filed Sept. 7, 1965, Ser. No. 485,466
3 Claims. (Cl. 61—4)

ABSTRACT OF THE DISCLOSURE

A container and method of building a breakwater by utilizing a section of a ship as by removing the bow and stern ends of a ship and also all super structure and then cutting the remaining hull into sections as containers followed by welding plates to the cut sections to provide approximately rectangular sections to be placed end to end to form the breakwater and pinning the sections to the bottom of the sea.

---

This invention relates to the building of breakwaters, bulkheads, jetties and like structures from sections of salvaged and obsolete ships as referred to in my co-pending application, Ser. No. 344,407, filed Feb. 12, 1964, now abandoned.

It is an object of this invention to provide a section of a steel vessel which has been declared outmoded or in surplus, with a plurality of teeth for the bottom of the section to thus provide means to hold the section in place. A further object of the invention resides in the provision of saw-tooth bottom aprons on the ship sections for ground holding power purpose so as to eliminate possible lateral movement or shifting of the casings and to prevent scouring of the supporting earth on the bottom of the casings.

A still further object of the invention resides in the provision of methods of procedure to cut away the bow and stern sections of tanker and other hulls and to utilize the midship section for the purpose of building up breakwater walls, bulkheads and jetties.

Further objects will be apparent from the following description when considered in connection with the accompanying drawings in which:

FIGURE 1 is a side view of a surplus ship indicating generally the parts to be cut away and the portion remaining as a container being indicated;

FIG. 2 is a perspective view of a portion of a ship built as a bulkhead;

FIG. 3 is a cross section of a portion of a ship showing anchoring means;

FIG. 4 is a part side view of a section of a breakwater;

FIG. 5 is a perspective view of a breakwater construction;

FIG. 6 is a top perspective view of a salvaged inner bottom section from the salvaged hull of a vessel;

FIG. 7 is a cross section showing a hull section being temporarily anchored in place for permanent pinning down;

FIG. 8 is a side view diagrammatically showing the bow and stern sections cut from the complete vessel;

FIG. 9 is an end view of a bow section;

FIG. 10 is an end view of a stern section;

FIG. 11 is a perspective view of a modified off-shore breakwater;

FIG. 12 is a stern end view of the hull;

FIG. 13 is a bow end view of the hull;

FIG. 14 is a perspective view of the filler section of the stern end;

FIG. 15 is a perspective view of the filler section of the bow end;

FIG. 16 is a perspective view of a modified breakwater;

FIG. 17 is a side elevation of a steel plate embedded into the bottom of the sea;

FIG. 18 is an end elevation of the steel plate of FIGURE 17;

FIG. 19 is a perspective view of a solid reinforced concrete unit; and

FIG. 20 is a cross section of a detail.

Referring to FIGURE 1, that figure shows a salvaged ship in which the front end 1, the stern end 2 and superstructure 3 are cut away and the mid portion 4 is cut into sections 5.

In general terms any unserviceable steel hull vessel may be used advantageously for the benefit of any waterfront land and water areas. The entire hull of the steel vessel as in FIG. 1, less bow 1 and stern 2 sections, may be used. Of course, all superstructure parts are removed and also all machinery and auxiliary installations and equipment from the interior are removed. The mid-section is cut up into small sections as shown in FIGS. 2 and 3.

FIG. 2 shows a section 6 having saw-tooth bottom aprons 7 welded or otherwise secured thereto in order to provide ground holding means to prevent possible lateral movement or shifting of the casing section. Also to prevent bottom scouring in addition, pinning piles 7', FIG. 3, may be driven through standpipes 8 in the interior of the casing 9. If further securing means are required it is only necessary to use salvaged steel beams and the like from the vessel to be used as deep pegs on the outside surface of the casing. The saw-toothed skirts 7 are preferably provided with holes 10 as drain holes on the top side under the bottom of the casing so that this will squeeze as much water from the mud bottom located in the box like area 11 of the apron as the casing is lowered to its final resting place.

As indicated in FIGS. 2 and 3 the casing 6 is filled with a reinforced concrete fill 12 and a central earth fill 13. An inside plate 14 is welded or otherwise secured to the section 6 for inshore side location which may be watertight. Element 15 indicates the off-shore side which is faced on the inside with the layer 12 of reinforced concrete.

It is of course obvious that a hull of a vessel can be cut up into any desired number of sections and individual shapes.

If a jetty, bulkhead, or similar type structure of considerable length, breadth and height is desired, this modified steel hull can be placed on the site with essentially no major changes to it. If a structure of greater length with the same breadth and height is required, it can be provided through the foreshortening of several hulls joining them end-to-end. This box-shaped hull can also be split lengthwise down the center line, salvaged steel plating installed to form the inboard sides of the halves, and two structures of lesser width are now available and can be joined end-to-end. Smaller sizes and designs can be made by cutting the hull into widths and heights of any desired dimensions. Still further variations can be obtained by cutting this hull crosswise or by reducing the height through removal of the upper decks.

As already referred to the casings 6 may be filled with concrete reinforced with light scrap material obtained from the dismantled vessel. In the construction of larger structures (offshore jetties, breakwaters, etc.) from the casings it would be economical to substitute sand or earth 13 as partial replacement for concrete in the center core spaces.

The side walls and the seaward end of a large structure should be angled toward the top capping as shown at 16 to lessen the impact of heavy wave action. The angled walls will lower the center of gravity of the structure and reduce the amount of reinforced concrete required without appreciable reduction in strength. In the structures of lesser breadth, such as inshore jetties, the angling of the side walls is not considered necessary.

Most of the salvageable metal removed from the vessel during the dismantling process can be used in the hull conversion and in the construction of the casings for the designed structures. Such metal salvage will include large amounts of steel plating from the removed bow and stern sections, the tank and cargo hatch tops, the decks and other sources. This plating can be used for side walls of casings and sections of the inner bottom, interior and exterior stiffeners and for the prolongation of the straight sides of the box-shaped hull.

Referring to FIGS. 4 and 5, they show a breakwater construction in which side plates 16' and 17 have H-shaped beams 18 as stiffening means which beams are left intact to add additional longitudinal strength and stiffening to the structure. The plate 16' is provided at the bottom part by a saw-toothed bottom apron 7 and steel plate clips 19 are bent at 20 to prevent the plates 16' and 17 from spreading relative to each other. These clip plates 19 drop into the H-shaped beams 18 and this structure is quite useful for an inshore jetty. The bottom plate 19 is suitably provided with a hole 21 through which a pinning pile may be driven therethrough and into the sea bottom as shown in FIG. 3. It is preferable that the plates 19 shall be spot welded when in position and previous to the insertion of the reinforced concrete filling.

The general use of a structure of FIGS. 4 and 5 is to provide closed assembly for ease in shipping and handling without requiring highly specialized labor and expensive standby equipment. The structure according to FIGS. 4 and 5 may be used basically for low inshore jetties for building up beaches by controlling water flow to retard beach erosion. Once in place no maintenance is required or at most only minor repairs may become necessary.

FIG. 6 illustrates a salvaged inner bottom section of an obsolete steel hull to provide for instance an emergency beach landing structure for military purposes and for breakwater and like applications. The construction shows a complete ramp 22 of heavy steel with a saw-tooth edge plate 23 to grip the sea bottom and these plates 23 are provided with holes 24 to release as much water as possible when the structure is set in place. End ramps 25 are provided and the side plates 26 are high enough over the ramp surface 22 for protection of vehicles and the like. This particular structure can be used for temporary or permanent breakwater sections and jetties and also to divert river silt for land reclamation, and the like.

FIG. 7 shows a reinforced concrete off shore breakwater which can be cut longitudinally from one hull and which can also be used for bulkheads, jetties, etc. The side plates 27 are lined with reinforced concrete 28 at the sides, bottom and also the top 29. The interior 30 is filled with sand, earth, rubble and the like. A pile 31 is driven through the bottom and into the bottom 32 of the sea 33. To set the bulkhead in place cables 34 may be used secured to anchors 35.

FIG. 8 shows diagrammatically a cargo hull 36 with cutaway bow 37 and stern 38 sections.

When the bow and stern sections of the hull of the vessel has been removed, there still remains a faired away or narrow portion of the hull, especially the stern. In order to obtain all possible length of casing it is advisable to build up this portion for maximum bottom bearing area, FIGS. 9 and 10.

The invention in general is to straighten out the faired away portion of a hull remaining to obtain continuity of casing lines up to each end to form a continuous box-like structure, in addition to a full bottom bearing of the hull from end-to-end when finally at rest on the bottom. This will be accomplished with salvaged plates from the vessel surplus and both ends will be closed. This work would not be structurally perfect or in fact perfectly watertight as in moving the casing into position, it is anticipated that the midship body watertight section will supply sufficient buoyancy to float the container into position for sinking the object in this case, and to provide a full lined hull section. To provide full bottom bearing area on the ground and to provide a symmetrical side end-to-end especially with bulkheads, this would only be required on the off shore side. The inboard side can be plated only sufficiently high over the casing to the deep load line for safe maneuvering into position and when sunk in position there is no use or necessity for any excess high side and waste of metal, and in fact it can become a handicap. When in position the off shore side where a buffer wall either of salvaged sheet steel can be fitted, or possibly a wooden bulkhead 2 to 3 feet from the outside or off shore side, would be filled with reinforced (auto scrap) or concrete for a buffer wall to take over when and if the steel shell corrodes through. This reinforced concrete should be extended to and fastened to the inner bottom section.

This procedure is in general especially designed for off shore breakwaters, channels, jetties, bulkheads and each case would require special study and consideration with variations of fabrication to suit local conditions. The additional cost of fabrication would warrant this, inasmuch as it would not be structurally correct. It is estimated that a saving of at least 50% would be accomplished over the cost of a conventional type bulkhead, in which the salvage of scrap alone would be a factor.

Pin piling can be used inside the casing to prevent lateral movement and located where it will best accomplish this at a location which is much more mechanically correct being at the center of gravity above and in the center of the structure below which tipping strain movement of the casing is prevented. Except in rare cases this piling would be required to take care of compression forces and in addition it is not designed for that purpose.

FIGS. 11 to 15 illustrate the remaining part 39 of the hull after removal of the bow and stern sections with FIG. 12 showing the stern end of the hull and FIG. 13 showing the bow end. A filler section 40 is filled in at each side of the stern end which is welded in place and a filler section 41 is welded in place at each side of the bow end and as shown in FIGS. 12 and 13 these filler sections 40 and 41 will round out the hull ends. In this way more of the hull of the ship can be used for bulkheads, jetties, etc.

FIG. 16 illustrates a plurality of containers which have been longitudinally cut from one hull and adapted for offshore breakwaters, bulkheads, jetties, etc. The top of the base sections 42 may be provided with a top surface 43 with side plates 44 so that such a breakwater construction may be used as a fishing deck. This structure may be built of sections as shown in FIG. 7 and also sections as shown in FIGS. 2, 3 and 5.

FIGS. 17 and 18 show a salvaged steel plate 42' cut from the side of a ship with the stiffening ribs 43 secured and remaining thereon and having a saw-toothed bottom plate 44 welded thereto. A plurality of piles 45 are driven into the bottom 46 secured to the plate 42' by U-shaped bolts 47 welded or otherwise secured to the plate. The bottom 46 extends along the side of the plate 42', FIG. 18, on the right side with the water 48 on the left side.

FIGS. 19 and 20 show a reinforced concrete unit 48 similar to beams used as longitudinal overhead for bypasses, building floor supports, trestles over waterways, etc. They are approximately 50' plus in length and these could be processed to use in the method, for low inshore jetties (groins, artificial reefs, etc.). It would be necessary to cast them with holes 50 in center, suitable to drive piles for pinning the unit on the bottom. For additional bottom holding and preventing lateral movement, sheet metal saw-tooth skirts 49 are cast into the concrete mass at 51, around the outside edges of blocks. In addition this skirt would prevent bottom earth scouring and this design could be used on inshore jetties (groins) or offshore under water jetties, to retard beach erosion on coastal waters.

The difference between a salvaged steel buoyant container and this solid concrete mass would be considerably less expense for the latter, without sacrificing efficiency. It would follow the basic idea of pinning the structure to the bottom with inside pin piling and also the use of the saw-tooth skirt principle, with squeeze hole openings.

I claim:
1. A container made from an obsolete ship comprising a section of a hull of a ship having side and bottom sheets of steel, bars of saw-toothed skirts secured to the bottom sides of the container to be forced into a bottom of the sea to more firmly secure the container in place, and a filling of material in the container to increase the weight of the container, the bars of saw-toothed skirts being each provided with a plurality of holes for passage of water and mud when the container is forced into the bottom of the sea.

2. A method of building a breakwater and the like comprising removing the bow and stern ends of a ship and also all superstructure, cutting the remaining hull into sections as containers, welding plates to the cut sections to provide approximate rectangular sections, placing the sections end-to-end to form the breakwater at the same time lining each section with reinforced concrete and material therewithin, and pinning the sections down into the bottom of the sea.

3. A container made from an obsolete ship comprising a section of a hull of a ship of which the bow and stern ends have been removed and having side and bottom sheets of steel, skirt bars secured to the side sheets of steel and extending below the bottom of the container, said bars being forced into the bottom of the sea to more firmly secure the container in place, and a filling of material in the container to increase the weight thereof, each bar having a plurality of holes therein for passage of water and mud when the container is forced into the bottom of the sea.

References Cited

UNITED STATES PATENTS

| | | | |
|---|---|---|---|
| 431,524 | 7/1890 | Marsh | 61—5 |
| 1,870,154 | 8/1932 | Wehr | 61—4 |
| 1,950,070 | 3/1934 | Sykes et al. | 61—4 X |
| 2,014,116 | 9/1935 | Powers | 61—4 |
| 2,622,404 | 12/1952 | Rice | 61—46.5 |
| 2,902,743 | 9/1959 | King. | |
| 2,967,398 | 1/1961 | Smith | 61—5 |
| 3,054,268 | 9/1962 | Muller | 61—52 |

FOREIGN PATENTS

| | | |
|---|---|---|
| 590 | 1886 | Great Britain. |
| 263,997 | 9/1927 | Great Britain. |

EARL J. WITMER, *Primary Examiner.*